(No Model.) 2 Sheets—Sheet 1.
R. MACRAE.
GOVERNOR OR REGULATOR FOR ELECTRIC MOTORS.
No. 412,928. Patented Oct. 15, 1889.
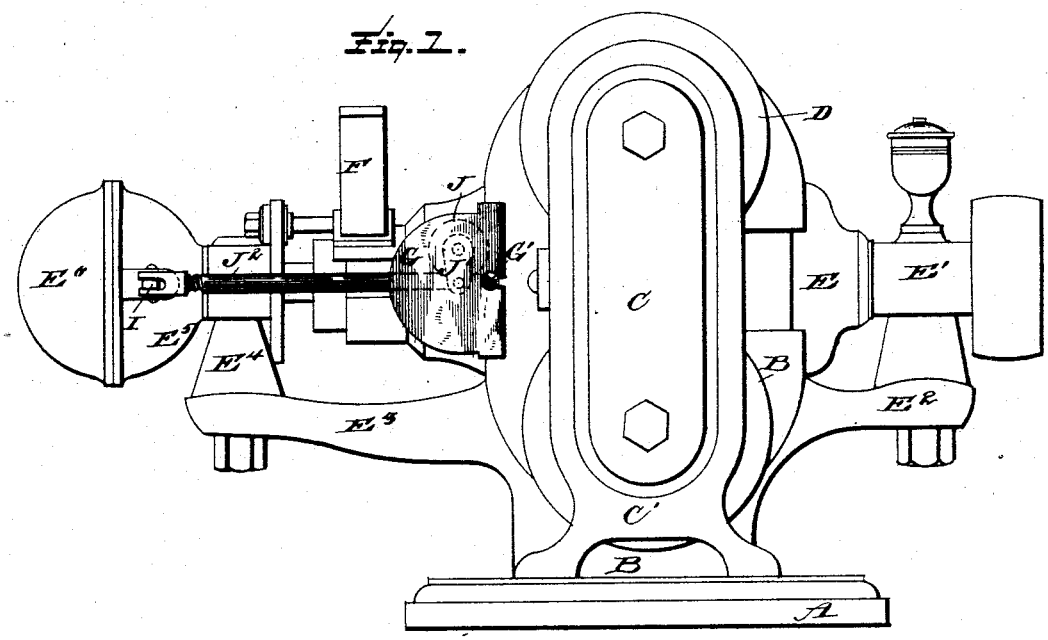
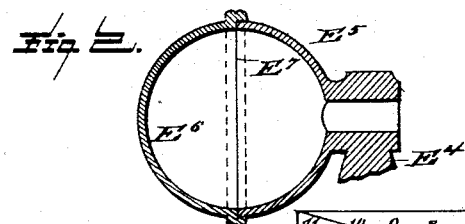
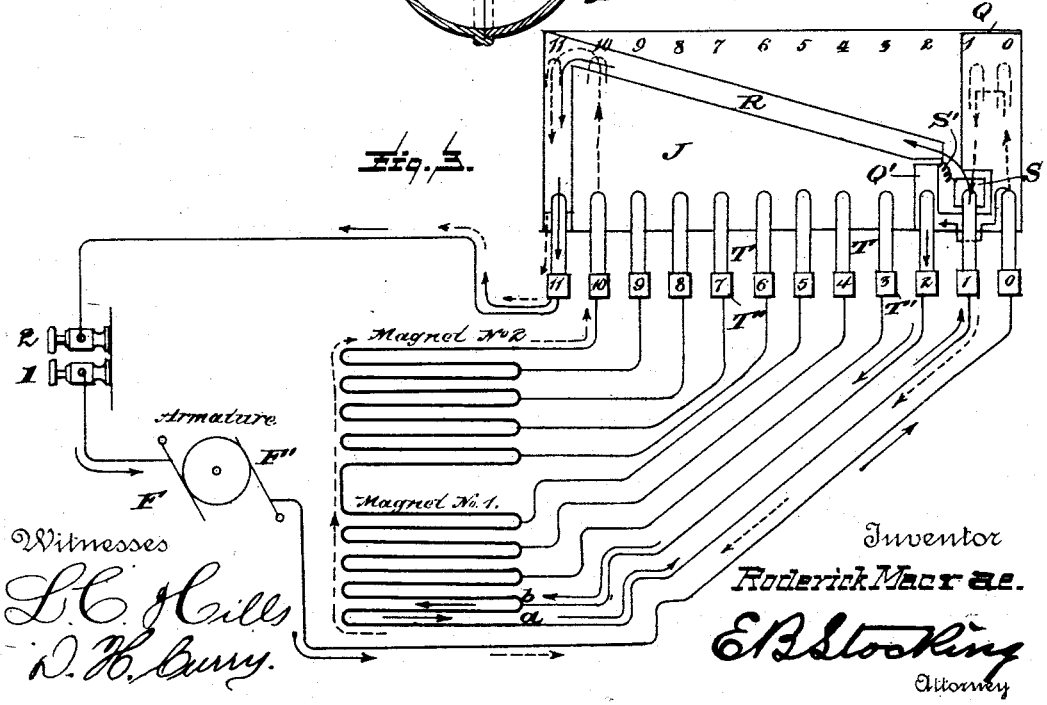
Witnesses
L. C. Hills
D. H. Curry
Inventor
Roderick Macrae
E. B. Stocking
Attorney (No Model.) 2 Sheets—Sheet 2.
R. MACRAE.
GOVERNOR OR REGULATOR FOR ELECTRIC MOTORS.
No. 412,928. Patented Oct. 15, 1889.
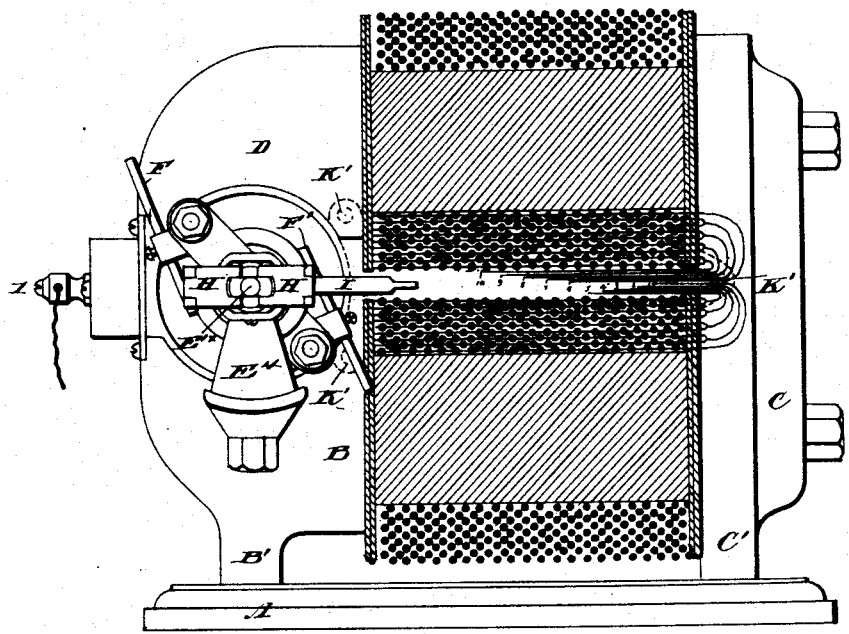
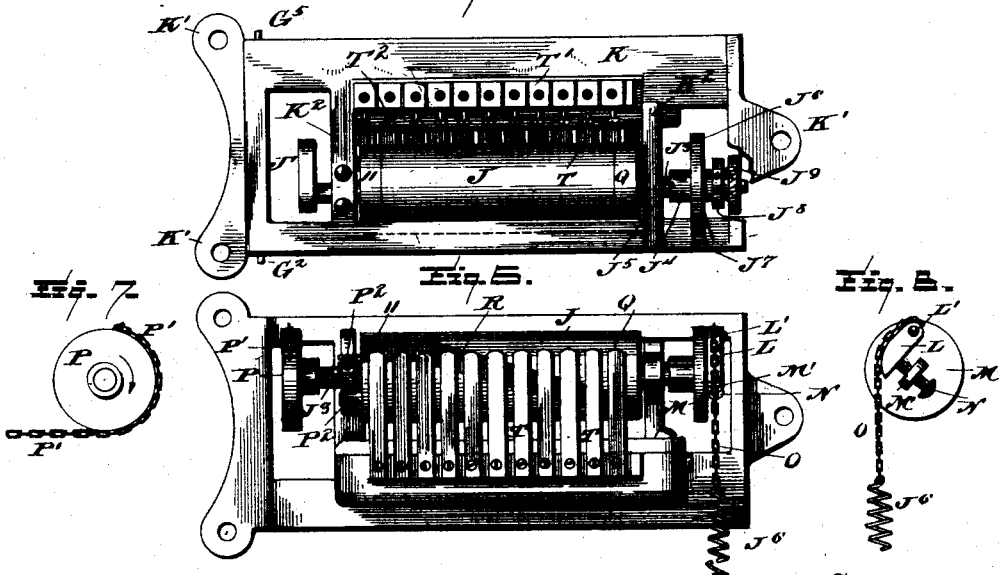
Witnesses
L. C. Hills.
D. H. Curry.
Inventor
Roderick MacRae.
E. B. Stocking
Attorney

UNITED STATES PATENT OFFICE.

RODERICK MACRAE, OF BALTIMORE, MARYLAND.

GOVERNOR OR REGULATOR FOR ELECTRIC MOTORS.

SPECIFICATION forming part of Letters Patent No. 412,928, dated October 15, 1889.

Application filed July 25, 1889. Serial No. 318,389. (No model.)

*To all whom it may concern:*

Be it known that I, RODERICK MACRAE, a subject of the Queen of Great Britain, residing at Baltimore, in the State of Maryland, have invented certain new and useful Improvements in Governors or Regulators for Electric Motors, of which the following is a specification, reference being had therein to the accompanying drawings.

This invention has relation to a regulator or governor for electric motors, the object of the invention being primarily to regulate the current passing through the motor in accordance with the work being performed and to control the regulation by variations in the speed of the rotation of the armature. When a motor is at work and its load is increased, the speed of rotation of the armature is naturally reduced, and vice versa. As in steam-engines, so, also, in electric motors centrifugal governors have been heretofore employed to control the current supplied to the motor in accordance with the work which it is called upon to perform, usually designated its "load." Centrifugal governors are not sufficiently sensitive in their operation. It requires too great a variation in the speed of the part or parts with which the governor is connected to produce a material difference in the effective work of the governor itself.

A secondary object of my invention is to render the centrifugal governor more sensitive in its effect, or, in other words, to produce more marked control of the current by less material variations in the operation of the governor or of the parts affecting the governor.

Other objects and advantages of the invention will appear in the following description, and the novel features thereof will be particularly pointed out in the claims.

Referring to the drawings, Figure 1 is an end elevation of an electric motor provided with a governor constructed in accordance with my invention. Fig. 2 is a central vertical section of a governor-case which may be employed. Fig. 3 is a diagram representing directions taken by the current through the motor under different conditions. Fig. 4 is a side elevation of the motor, the field-magnets being partly in section. In this view the centrifugal governor is shown in end elevation and with a portion of its case removed. Fig. 5 is a bottom view of the current-controlling cylinder. Fig. 6 is a plan of the same with certain modifications. Fig. 7 is an end elevation of the chain-pulley at the left of Fig. 6, and Fig. 8 is a similar view of a chain-cam located at the right of Fig. 6.

Like letters refer to like parts in all the figures.

On a suitable base A is mounted the field-magnet B, provided with the standard B', to which is secured the bar C and the standard C', also provided with suitable bearing-surfaces to rest upon the base A. The bar C is also properly and in any usual manner connected with the field-magnet D.

E is the armature, running in bearings E', supported in the bracket $E^2$. A similar bracket $E^3$ supports the bearing $E^4$, which has a hemispherical casing $E^5$ cast integral therewith. (See Fig. 2.) The hemispherical cap $E^6$ is adapted to be screwed upon the part $E^5$ at the equatorial line $E^7$ of the completed sphere. This casing is constructed and arranged to cover the mechanical parts of the centrifugal governor for purposes of safety in preventing contact therewith by the person of the user, and also to prevent any accumulation of dust, lint, and dirt, which is a liable occurrence in rapidly-revolving machines.

The armature-brushes F F' are supported in any suitable manner upon the bearings $E^4$, as clearly illustrated in Fig. 1.

Parallel to the field-magnets and secured thereto or to the adjacent frame-work, as desired, is a case G, the screw G' serving to secure one end thereof to the frame-work, while pins, screws or bolts $G^2$, Fig. 5, projecting from the controller-cylinder frame-work serve to maintain the opposite end of the case G in position.

H H represent the usual well-known toggle-links of a centrifugal governor, and I represents an arm so connected with the governor or its links as to be given an oscillation lengthwise of the shaft E' of the armature when variations in its speed of rotation occur. The connection between the centrifugal governor and the arm I may be of any well-known form, as it does not enter into my invention as a part thereof. In fact, any centrifugal governor may be employed and any suitable connections used between it and the cylindrical electric-current controller hereinafter described.

Within the case G in Fig. 1 I have represented by dotted lines the cylindrical current-controller J and a crank J', secured to its spindle and pivoted to a connecting-rod $J^2$, the latter being operatively connected to the arm I, whereby oscillations of said arm are communicated to the cylinder J.

A more particular description of the current-governor J will be understood in connection with Figs. 5 and 6.

K represents a frame-work terminating in ears K', whereby it may be secured to the field-magnets or to the frame-work of the motor, as shown by dotted lines in Fig. 4. This frame-work has bridges or bearings $K^2$ for the journals of the cylinder J. At the end of the shaft $J^3$ of the cylinder J there is mounted a sleeve $J^4$, one end of which is provided with a series of notches, each one of which is adapted to receive a pin $J^5$, projecting from the shaft $J^3$. A convolute spring $J^6$ is secured at one end of the sleeve $J^4$, and the other end of said spring is secured at any suitable point to the frame K—as, for example, at $J^7$. The other end of the sleeve is provided with a peripheral flange $J^8$, which has a series of holes therein to receive a pin or bar. At the extreme end of the shaft $J^3$ there are formed screw-threads to receive the thumb-nut $J^9$. Now, by putting a pin or bar into any of the holes in the flange of the sleeve said sleeve, after loosening the thumb-nut $J^9$, may be rotated on the shaft, so as to adjust the spring $J^6$ to a greater or less tension, when by moving the sleeve toward the cylinder until the pin $J^5$ rests in one of the notches in the end of the sleeve and tightening the thumb-nut said adjustment of the spring is retained.

As thus far described, it will be seen that the centrifugal governor will cause the cylindrical current-controller J to oscillate in its bearings, and that by adjusting the tension of the spring $J^6$ the degree of oscillation produced by a certain variation in the speed of rotation of the armature acting through the centrifugal governor may be predetermined.

In the modification illustrated in Fig. 6 I secure the same advantages of control and adjustment, and, in addition thereto, I secure the advantage of neutralizing the materially-increased resistance of the spring while it is being put under tension.

In the mechanism illustrated in Fig. 5, when the centrifugal governor has caused the cylinder J to oscillate against the tension of the spring $J^6$, further oscillation is resisted by the spring more than that oscillation which has been accomplished, because the resistance of the spring constantly increases. Now, if I can give the cylinder J a greater leverage on the spring as its oscillation increases, then the resistance of the spring is rendered practically uniform throughout the complete and extreme oscillations of the cylinder which are produced by the centrifugal governor.

In Fig. 8 a cam L is provided. Said cam is pivoted, as at L', to the face of the disk M, mounted on the cylinder-shaft $J^3$. Said disk has a bracket M', through which the adjusting-screw N passes, so as to abut against the free end of the cam L. A chain O is secured at or near the heel of the cam, so as to pass along over the periphery of the cam. The chain O is secured to the spring $J^6$, and the spring in turn is connected with the adjusting-screw O', passing through a bracket $O^2$, secured to any fixed part of the apparatus. Now, it will be noticed that the cam may be adjusted to or over the center of the disk, so as to give a greater or less leverage to the cylinder on the spring $J^6$, when the spring has been put under a moderate degree of tension, thereby rendering the resistance of the spring to the oscillation of the cylinder in a direction against the tension of the spring less than it would be were it not for the presence of the cam. At the opposite end of the cylinder-shaft $J^3$ I have shown another disk P and the chain P', which chain is intended to be extended to and connected with the arm I of the centrifugal governor. At this end of the cylinder there are two pins $P^2$, which project from the cylinder over the bearing-block of its journal and strike against the same and limit the oscillation of the cylinder.

I now proceed to describe the electrical construction and arrangement of the current-controller and its connections. Referring to Fig. 3, the cylinder J has at one end thereof an encircling band 11 of conducting material. At the other end it has a band Q of similar material; but this latter band need not necessarily extend completely around the cylinder. A spirally-disposed strip of conducting material extends from the band 11 to or near to a block S of conducting material, arranged within the area of the band Q, but electrically disconnected or insulated therefrom. An electrical connection S' is provided between the block S and the strip R. The band or bar Q is extended in L shape, as at Q', around the block S. The remaining peripheral surface of the cylinder J is constructed of any suitable non-conducting material. A series of contact-springs T are mounted on blocks T' (see Figs. 3, 5, and 6) and insulated from each other and from the frame-work, and are arranged to bear upon the cylinder, as shown. Each of the blocks is perforated and provided with a binding-screw $T^2$, as clearly shown in Fig. 5, for the reception of the terminals 1 to 11 of the various layers or coils of the field-magnets B and D. The electrical connections are clearly shown in Fig. 3. A conductor extends from the brush F' of the armature to the block and contact-point O. Another conductor extends from the brush F to binding-post 1, and from binding-post 2 to the block and contact 11. From each of the coils of the magnets there extend terminals to the blocks 1 to 10, inclusive. (See Fig. 4.) The full-line connections in Fig. 3 of the diagram (representing the cylinder J extended) are those which occur at the limit of the oscillation of the cylinder when the motor is suddenly relieved of its load and running free without load, while the solid arrows indicate the direction of the current under reverse conditions. The current passes from the brush F' to the block and contact-finger O, thence along the extension of the plate Q under (not having contact with) the contact 1 to the contact 2, thence along the conductor or terminal connected with said contact 2 to the coil b, and reversely along the coil a to the contact 1, the block S, the conductor S', the strip R, the plate 11, the contact 11, and from thence through the conductor to the binding-post 2. Now, it will be noticed that under these conditions only a single coil of the motor is brought into action, agreeing with the requirements of its load or the work which at the instant it is called upon to perform. Under the opposite conditions of work—that is, with a maximum load (the numbers along the upper portion of the diagram in Fig. 3 indicating the relative position of the various contact-fingers T)—it will be seen that when oscillated in an opposite direction the fingers 10 and 11 and O and 1 will be the only ones having contact with conducting material on the cylinder. In such case the current takes the direction indicated by dotted arrows—that is, from the brush F to O—from O directly to 1 along the connection of 1 to coil a, from thence to b, and all subsequent coils of the field-magnets to block 10 and its contact-finger, and from thence directly to 11 and to the binding-post 2. In this instance the entire force of the motor is employed, as all of its coils are brought into action. Now, taking an intermediate condition of circumstances in the operation of my invention in this regard, it will be seen that some one or more of the intermediate fingers T and finger 11 will be in contact with conducting material at some point along the spirally-disposed strip R, while the contact 11 will be continuously in contact with the completely-enveloping conducting-plate of the cylinder, so that the oscillations of the cylinder may cut out the adjoining coils connected by 8 and 9, or 4 and 5, or 6 and 4, or other coils of the series of contacts. The mechanical disposition and relative arrangement of the cylinder with the centrifugal governor, together with the arrangement of the electrical connections, render the more slight variations of the governor effective in controlling the current, and this effectiveness is further heightened by the presence of the counterbalancing-spring, and this heightened advantage is materially enhanced by the influence of the cam in giving increased leverage to the cylinder against the materially-increasing tension of its counter oscillating spring. The adjustable cam and spring gives complete control of the action of the centrifugal governor. This I consider important. By means of the cam and spring adjustments the motor could be made to run even more slowly with the cylinder in this position than when at the other limit of its range, if anything were gained by doing so. The adjustment desired, however, is that which for a given standard speed of the armature will allow the cylinder to rest in any position of its range. A momentary change of speed must of course take place in order to give the impetus necessary to overcome the friction of the contact-springs and allow the cylinder to assume that position in which the distribution of current is such as is necessary and sufficient for maintaining the standard speed under the conditions of load existing at that instant. If the speed of the armature is kept constant and the governor allowed to pass from its normal to its abnormal position, the effective pull on the connecting rod or chain will vary as the relative positions of the parts of the toggle vary; but according to whatever law this pull does vary the opposing force due to spring and cam can be made to vary in exactly the same manner.

What I claim is—

1. The combination, with an electric motor, of a mechanical speed-governor, an oscillating current-controller connected with the speed-governor, and a counter oscillating spring adjustably connected with the current-controller, substantially as specified.

2. The combination, with an electric motor, of a mechanical speed-governor and an oscillatory current-controller having conducting and non-conducting surfaces at opposite ends, an intermediate diagonal or spiral conducting-surface, and contact-points electrically connected with the main circuit at the extremities of the controller and with the several coils of the field-magnet, whereby variations of speed in the motor cause changes in the extent of the field-magnets employed in operating the motor, substantially as specified.

3. An electrical current-controlling device for motors, comprising a cylinder having mainly a non-conducting periphery provided with conducting-surfaces, of which one extends completely around the cylinder at one end, another extends spirally from the said complete surface to or near to the opposite end of the cylinder, where it is electrically connected with an insulated conducting-plate and surrounded, but disconnected electrically from a third conducting plate or surface, substantially as specified.

4. A current-controller for electric motors, comprising a cylinder having end peripheral conducting-surfaces, a spiral conducting-surface electrically connected with an electrically-separated conducting-surface surrounded by and electrically disconnected from an opposite terminal conducting-surface, and a series of contact-points arranged to bear upon the periphery of the cylinder and electrically connected with the field-magnets of the motor and with the main circuit thereof, substantially as specified.

5. A current-controller for electric motors, consisting of a cylinder of the character described, and electrically connected with the field-magnets, and mechanically connected with the speed-governor operated by the motor, a cam adjustably mounted for oscillation with the cylinder and connected by a chain with an adjustable counter oscillating spring, substantially as specified.

6. The combination, with an electric motor, of a current-controlling cylinder mounted in a frame arranged parallel with the field-magnets, and provided with devices for mechanically connecting the same with a speed-governor mounted on the armature-shaft of the motor, substantially as specified.

7. The combination, with an oscillatory current-controller, of a cam mounted for oscillation with said controller, means for adjusting the cam to and from the center of oscillation, a chain connected with and extending along said cam and connected with an adjustable spring, substantially as specified.

In testimony whereof I affix my signature in presence of two witnesses.

RODERICK MACRAE.

Witnesses:
THOMAS KELL BRADFORD,
S. W. BRADFORD.